United States Patent
Najera Garcia

(10) Patent No.: US 11,511,586 B2
(45) Date of Patent: Nov. 29, 2022

(54) SHOCK ABSORBER WITH FREQUENCY-DEPENDENT LOAD REGULATION BY HYDRAULIC INERTIA

(71) Applicant: Jasiel Najera Garcia, Boras (SE)

(72) Inventor: Jasiel Najera Garcia, Boras (SE)

( * ) Notice: Subject to any disclaimer, the term of this patent is extended or adjusted under 35 U.S.C. 154(b) by 0 days.

(21) Appl. No.: 17/267,828

(22) PCT Filed: Aug. 7, 2019

(86) PCT No.: PCT/ES2019/070556
§ 371 (c)(1),
(2) Date: Feb. 11, 2021

(87) PCT Pub. No.: WO2020/035628
PCT Pub. Date: Feb. 20, 2020

(65) Prior Publication Data
US 2021/0188032 A1 Jun. 24, 2021

(30) Foreign Application Priority Data
Aug. 14, 2018 (ES) ................ ES201800189

(51) Int. Cl.
*B60G 13/18* (2006.01)
*F16F 7/10* (2006.01)
*F16F 7/112* (2006.01)
*F16F 9/504* (2006.01)

(52) U.S. Cl.
CPC ............ *B60G 13/18* (2013.01); *F16F 7/1034* (2013.01); *F16F 7/112* (2013.01); *F16F 9/504* (2013.01)

(58) Field of Classification Search
CPC ......... B60G 13/18; F16F 7/112; F16F 7/1034; F16F 9/504
USPC ........... 188/322.15, 322.22, 280, 281, 282.1, 188/282.5, 282.6, 282.9, 316, 317
See application file for complete search history.

(56) References Cited

U.S. PATENT DOCUMENTS

| | | | | |
|---|---|---|---|---|
| 2,225,986 A | * | 12/1940 | Glezen ................... | F16F 9/348 188/314 |
| 4,236,607 A | | 12/1980 | Halwes et al. | |
| 4,588,053 A | * | 5/1986 | Foster ..................... | F16F 9/512 188/282.1 |
| 5,332,068 A | * | 7/1994 | Richardson ............. | F16F 9/504 137/38 |
| 6,352,145 B1 | * | 3/2002 | DeMolina ................ | F16F 9/48 188/281 |

(Continued)

FOREIGN PATENT DOCUMENTS

| | | |
|---|---|---|
| DE | 2139942 B1 | 11/1972 |
| DE | 19915635 A1 | 10/2000 |

(Continued)

*Primary Examiner* — Vishal R Sahni
(74) *Attorney, Agent, or Firm* — Hoglund & Pamias, PSC; Roberto J. Rios

(57) ABSTRACT

Hydraulic damper with load regulation as a function of frequency by means of hydraulic inertia composed of a cylinder, comprising an inner chamber, a rod, a main piston and an inertia piston, immersed in a hydraulic fluid, so that the inner chamber is divided into 3 sub-chambers, the main piston comprises a flow path controlled by valves to allow bidirectional flow of fluid between the sub-chambers and the inertia piston comprises a flow path called the inertia channel configured to allow fluid flow between sub-cameras at both sides of the inertia piston.

4 Claims, 3 Drawing Sheets

(56) References Cited

U.S. PATENT DOCUMENTS

Figure 1:
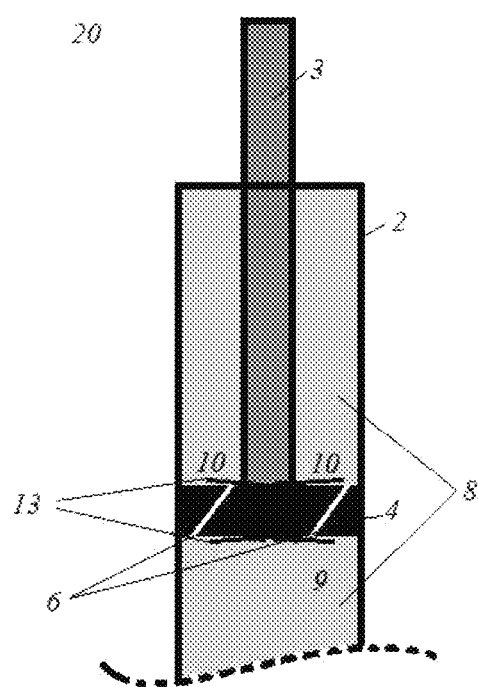

| | | | | |
|---|---|---|---|---|
| 7,104,369 B2* | 9/2006 | Heyn | ............... | F16F 9/3214 |
| | | | | 188/288 |
| 8,245,823 B2* | 8/2012 | Zeissner | ............ | F16F 1/328 |
| | | | | 188/322.22 |
| 8,302,746 B2* | 11/2012 | Azekatsu | ............ | F16F 9/5126 |
| | | | | 188/322.15 |
| 9,080,634 B2 | 7/2015 | Nowaczyk et al. | | |
| 9,611,915 B2* | 4/2017 | Park | ............. | F16F 9/3405 |
| 2002/0027051 A1* | 3/2002 | Grundei | ............. | F16F 9/5126 |
| | | | | 188/322.22 |
| 2006/0086581 A1* | 4/2006 | Vanbrabant | ......... | F16F 9/348 |
| | | | | 188/281 |
| 2015/0167773 A1 | 6/2015 | Gartner et al. | | |
| 2015/0276005 A1* | 10/2015 | Kim | ............. | F16F 9/348 |
| | | | | 188/317 |

FOREIGN PATENT DOCUMENTS

| | | |
|---|---|---|
| DE | 102004015448 B3 | 8/2005 |
| EP | 2789872 A2 | 10/2014 |
| ES | 2261747 T3 | 11/2006 |
| FR | 2892973 A1 | 2/2008 |
| WO | 2011130816 A1 | 10/2011 |

\* cited by examiner

SHOCK ABSORBER WITH FREQUENCY-DEPENDENT LOAD REGULATION BY HYDRAULIC INERTIA

STATE OF THE ART

This invention relates in the state of art of the on the component industry for mechanical vibration control in machines. A particular case of application for this invention is as shock-absorber for vehicle suspensions.

BACKGROUND OF THE INVENTION

The function of shock absorbers is to attenuate vibration in the moving parts of the machines in which they are built-in. In the particular case of vehicle suspensions, these shock absorbers provide a double function: 1) ensure the stability of the vehicle due to acceleration braking and steering maneuvers, as well as the vertical inputs from the road; 2) isolate or attenuate the inputs transmitted through the wheels and suspension into the body and therefore to the vehicle occupants.

In order to optimize these criteria and to minimize the movement of the vehicle body, higher levels of damping are required, where in order to minimize the transmissibility of the wheel movement to the body rather low damping levels are required. In order to obtain a better suspension behavior on both criteria, different systems have been developed which adapt the damping levels as a function of the dynamic state of the vehicle and/or the road profile.

The most common type of industrialized shock-absorbers are formed by a piston connected to a rod which moves inside a fluid filled cylinder. The piston divides the hydraulic fluid into two different chambers. The hydraulic fluid can flow from one chamber to the other through calibrated orifices in the piston. One end of the rod is usually connected to the body and the cylinder is connected to the wheel.

Due to the relative movement between the body and the wheel of the vehicle, the rod follows a proportional movement inside the cylinder, creating a hydraulic flow between one chamber to the other. Since the fluid is incompressible the flow through the piston is proportional to the relative movement of the shock absorber ends. The difference of pressure generated by the piston is proportional to the flow of the fluid through the calibrated orifices.

Since the damping load is proportional to the relative speed of the shock absorber ends, under high frequency and big amplitude inputs, high loads are created at the damper ends which means higher transmissibility of the road profile to vehicle's body.

Adjustable hydraulic systems which are controlled by computer have been developed in order to filtrate the road profile and keep a good level of body control. By means of sensors and algorithms is possible to adapt the calibrated orifices in order to obtain optimum damping levels in real-time. These systems are expensive and in some cases their performance is not optimum in terms of road adaptation.

Other systems developed to improve comfort in vehicles keeping at the same time a good level of damping are the shock absorbers with frequency selective damping. These dampers provide high load levels under low frequency movements providing good vehicle stability and providing low levels of damping under high frequency inputs, filtering better road inputs. An example of such a system is ES2261747T3.

One of the inherent problems of these solutions is that when high frequency damping is reduced, the wheel damping in each resonant frequency is also reduced, leading to the so called "wheel-shake" or wheel vibration. This phenomenon can lead to less tyre grip and poor passenger comfort due to the wheel vibration being transmitted to the body, It would be therefore a design goal to achieve a system which: 1) control the mass of the vehicle at low frequency providing high level of viscous damping 2) provide low damping levels at higher frequencies 3) achieve good damping levels for the wheel movement despite low levels of viscous damping.

The benefits of tuned mass dampers in the control of structures are widely known. These dampers are made of a mass connected through a spring and a damper in parallel to the main mass. The added mass is less than the primary mass. The eigen-frequency of the added mass is slightly lower than the system to be damped. Around the eigen frequency of the added mass, these oscillate in counter-phase, therefore producing the dampening effect on the primary mass. This can be considered dynamic damping and is more efficient than the viscous damping.

One way to integrate this concept of dynamic dampening is shown in hydraulic mounts used to support the engines to the body as well as in hydro-bushings used in suspension systems. These elements are formed by hydraulic chambers connected by an inertia channel. Due to the movement generated at the end of the mount, the hydraulic fluid is forced to be accelerated through the inertia channel of reduced diameter. This inertial effect generated by this channel is equivalent to the inertia of the mass in a tuned mass damper system, with the benefit that the total mass of the fluid is lower than the mass that would produce an equivalent dynamic effect.

In order to achieve a better performance in suspensions as described above, the following designs are known:

Document DE102004015448B3 describes a shock absorber whose dampening level is dependent on the amplitude movement of its ends and therefore presents a solution for the criteria 1) and 2) described above. The working principle is based on a sliding piston whose movement is controlled by springs which, when compressed, control the pressure difference through the sliding piston.

The document US20150167773A1 describes a damper in which inertia channels are used. The singularity of this design is that the pressure difference through the inertia channel is equal to the pressure difference through the main piston of a conventional damper. Therefore, it is understood that these pressure differences are in series.

In FR2892973A1 a suspension topology is presented in which a tuned mass damper connecting in series the wheel mass and the body. This invention uses as well a piston system connected by an inertial channel in order to optimize the inertial mass system In EP2789872A2 a suspension topology with a tuned mass damper is presented as described in FIG. 2. In its constructive form it builds a tuned mass system using an inertial channel inside a conventional shock absorber.

U.S. Pat. No. 9,080,634B2 describes a shock absorber with frequency dependent load by means of a flow parallel to the main pistons flow. This hydraulic is controlled by the flow itself. At higher movement frequencies this parallel flow stays open and the damping load is therefore lower, achieving therefore a frequency dependent load.

DESCRIPTION OF THE INVENTION

In order to achieve the objectives explained above, the present invention proposes a hydraulic damper whose viscous damping level is dependent of the frequency, providing a dynamic damping as well by means of an inertial channel connected to one of the ends of the shock absorber.

The present invention comprises one rod connected to a main piston that moves inside a hydraulic fluid contained a cylinder. In this damper, the main piston divides the oil volume into two chambers. Through the calibrated orifices of the main piston, oil can flow from one chamber to the other. One damper end is generally connected to the body and the cylinder to the wheel.

According to the present invention an additional piston is introduced in the design, inertial piston, which divides one chamber into two sub-chambers; therefore, the oil in the damper is divided in 3 chambers. The inertia piston is connected to the rod by at least one spring and the sub-chambers divided by the inertial piston are connected by an inertia channel.

The pressure difference at both inertial channel ends is proportional to the channel length and the mass flow through it, and proportionally inversely proportional to the area of the inertia channel. Since the total volume of the three chambers is constant and considering the oil incompressible, the flow through the inertial piston is proportional to the inertia piston movement inside the chamber.

The inertial piston movement equals the movement of the rod plus the relative movement of the inertia piston to the piston rod. Therefore, the dynamic response of this system relates to a dynamic tuned mass damper. Choosing correctly the spring parameters and the inertia channel dimensions the eigen-frequency of the inertia piston can be tuned in order to match and attenuate the wheel vibration.

In a further development of the invention presented, a third flow is opened in parallel between the chambers divided by the main piston. This third flow can be controlled by the movement of the inertia piston. Since the inertia piston moves only under movements of higher frequencies of the main piston, the viscous load can be reduced by lowering the pressure difference at both sides of the inertia piston.

In a more advanced design, the flow through this piston at high frequencies can be controlled providing better and more precise control at high frequencies.

DESCRIPTIONS OF THE DRAWINGS

FIG. 1—Shows schematically a conventional damper design.

Figure 2:
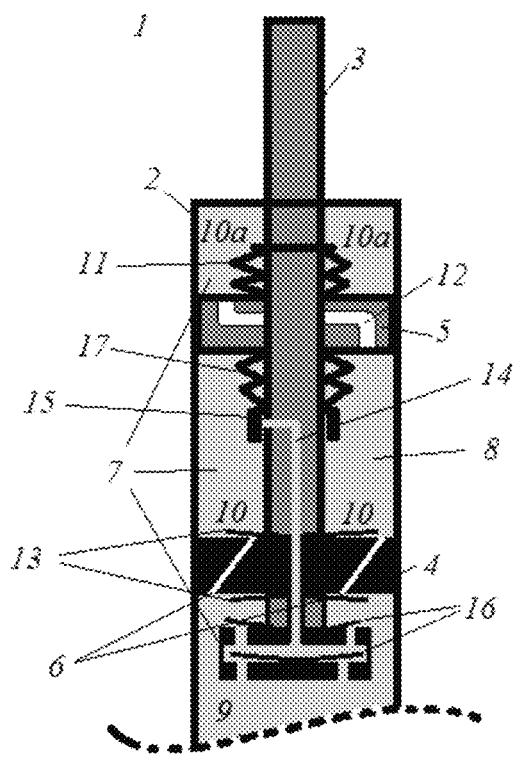

FIG. 2—Shows schematically an embodiment of a dynamic tuned mass damper according to this invention.

Figure 3:
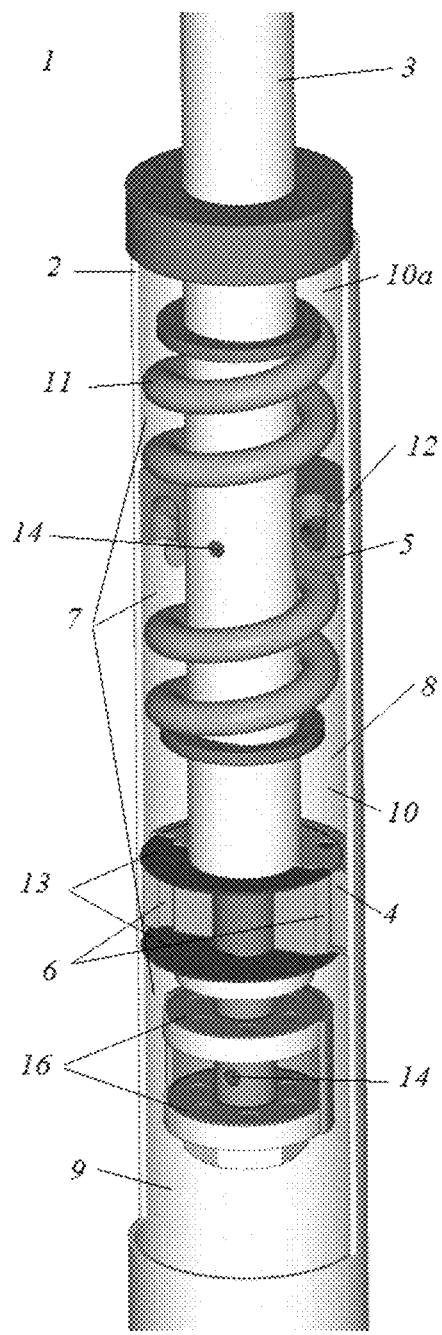

FIG. 3—Shows a more detailed 3D design of a dynamic tuned mass damper according to this invention.

PREFERRED EMBODIMENT OF THE INVENTION

Based on the design of a conventional shock absorber (20), in which a rod (3) is attached to a main piston (4) moving inside a hydraulic fluid (8) contained in a cylinder (2), calibrated holes (6) are created in the main piston (4) that enables the flow of fluid (8) from a first sub-chamber (9) to another second sub-chamber (10) or vice versa. The outer end of the rod (3), in the case of vehicles, is generally connected to the body of the vehicle and the cylinder (2) is connected to the wheel.

An additional piston (5) is introduced, inertia piston, that divides the chamber (10) into two sub-chambers (10) and (10a). In this way the fluid (8) contained in the shock absorber is divided into a first sub-chamber (9), a second sub-chamber (10) and a third sub-chamber (10a). The inertia piston (5) is connected by at least one first spring (11) to the rod (3). The second sub-chamber (10) and the third sub-chamber (10a) that are divided by the inertia piston (5) are connected by an inertia channel (12).

The pressure difference at both ends of the inertia channel (12) is proportional to the length of the inertia channel (12) and the mass flow through the inertia channel (12), inversely proportional to the cross-sectional area of the inertia channel (12). Because the total volume of the second sub-chamber (10) and the third sub-chamber (10a) is constant and considering that the fluid (8) is incompressible, the mass flow through the inertia piston (5) is proportional to the movement of the inertia piston (5) within the second sub-chamber (10) and the third sub-chamber (10a).

The movement of the inertia piston (5) equals to the movement of the rod (3) plus the relative movement of the inertia piston (5) with respect to the rod (3). Therefore, the frequency response of the inertia piston (3) is similar to the frequency response of a dynamic tuned mass damper. By appropriately choosing the parameters of the first spring (11) and the dimensions of the inertia channel (12), it is possible to adjust the resonance frequency of the inertia piston (5) and thus provide a dynamic damping of the wheel mass.

In an advanced embodiment of the idea presented here, a parallel fluid channel (14) is opened between the chambers (9) and (10) or (10a) separated by the main piston (4). This flow, hydraulically parallel to the main piston (4) is opened or closed by the inertia piston (5) or by a sliding valve (15) rigidly or elastically connected to the piston (5). The inertia piston (5) moves under movements of the main piston of high frequencies (4), whereby the inertia piston (5) or the sliding valve (15) opens an additional flow (14) only at high frequencies decreasing the pressure difference on both sides of the main piston (4) and therefore decreasing the viscous damping force.

In a more advanced design, high frequency flow can be controlled through a load regulating valve (16) so that the pressure difference at high frequencies can be controlled more precisely.

The invention claimed is:

1. A shock absorber with frequency-dependent load regulation by means of hydraulic inertia comprising:
   a cylinder with an inner chamber divided into a first sub-chamber defined between a main piston and an end of said inner chamber, a second sub-chamber defined between said main piston and an inertia piston, and a third sub-chamber defined between said inertia piston and another end of said inner chamber, wherein said main piston and said inertia piston are immersed in a hydraulic fluid and move longitudinally in the cylinder;
   a piston rod connected to said main piston, wherein said main piston comprises at least one conduit provided through said main piston and having a first opening provided inside the first sub-chamber and a second opening provided inside the second sub-chamber;
   a first valve provided inside said first sub-chamber and a second valve provided inside the second sub-chamber, wherein the bi-directional flow of said hydraulic fluid between said first sub-chamber and said second sub-chamber is regulated when said first valve and said second valve block and unblock said first opening provided inside the first sub-chamber and said second opening provided inside the second sub-chamber;
   an inertia channel provided through said inertia piston connecting said second sub-chamber and said third sub-chamber and being configured to allow a valveless bi-directional flow of said hydraulic fluid between said second sub-chamber and said third sub-chamber through the same inertia channel conduit;

an inner conduit provided inside said piston rod and having a first opening inside the first sub-chamber and a second opening provided inside the second sub-chamber so that said inner conduit connects the first sub-chamber and the second sub-chamber to allow the flow of said hydraulic fluid between the first sub-chamber and the second sub-chamber;

a spring connecting said inertia piston to the piston rod and a second spring connecting said inertia piston to a slide valve provided on said second sub-chamber, wherein said slide valve is moved to control the flow of the hydraulic fluid between said first sub-chamber and said second sub-chamber by blocking and unblocking said second opening provided inside the second sub-chamber; and a load regulating valve connected to said piston rod and being provided inside said first sub-chamber, said load regulating valve being configured to regulate the flow of the hydraulic fluid flowing through said inner conduit between said first sub-chamber and said second sub-chamber.

2. The shock absorber according to claim 1, wherein said load regulating valve comprises:

a first opening connected to said inner conduit, at least one second opening and at least one third opening provided opposite to said at least one second opening, wherein the flow of the hydraulic fluid flowing through said inner conduit is regulated when said at least one second opening is blocked or unblocked by a third valve and said at least one third opening is blocked or unblocked by a fourth valve.

3. A shock absorber with frequency-dependent load regulation by means of hydraulic inertia comprising:

a cylinder with an inner chamber divided into a first sub-chamber defined between a main piston and an end of said inner chamber, a second sub-chamber defined between said main piston and an inertia piston, and a third sub-chamber defined between said inertia piston and said inner chamber, wherein said main piston and said inertia piston are immersed in a hydraulic fluid and move longitudinally in the cylinder;

a piston rod connected to said main piston, wherein said main piston comprises at least one conduit provided through said main piston and having a first opening provided inside the first sub-chamber and a second opening provided inside the second sub-chamber;

a first valve provided inside said first sub-chamber and a second valve provided inside the second sub-chamber, wherein the bi-directional flow of said hydraulic fluid between said first sub-chamber and said second sub-chamber is regulated when said first valve and said second valve block and unblock said first opening provided inside the first sub-chamber and said second opening provided inside the second sub-chamber;

an inertia channel provided through said inertia piston connecting said second sub-chamber and said third sub-chamber and being configured to allow a valveless bi-directional flow of said hydraulic fluid between said second sub-chamber and said third sub-chamber through the same inertia channel conduit;

an inner conduit provided inside said piston rod and having a first opening inside the first sub-chamber and a second opening provided inside the second sub-chamber so that said inner conduit connects the first sub-chamber and the second sub-chamber to allow the flow of said hydraulic fluid between the first sub-chamber and the second sub-chamber;

a spring connecting said inertia piston to the piston rod, wherein said inertia piston is moved to control the flow of the hydraulic fluid between said first sub-chamber and said second sub-chamber by blocking and unblocking said second opening provided inside the second sub-chamber; and a load regulating valve connected to said piston rod and being provided inside said first sub-chamber, said load regulating valve being configured to regulate the flow of the hydraulic fluid flowing through said inner conduit between said first sub-chamber and said second sub-chamber.

4. The shock absorber according to claim 3, wherein said load regulating valve comprises:

a first opening connected to said inner conduit, at least one second opening and at least one third opening provided opposite to said at least one second opening, wherein the flow of the hydraulic fluid flowing through said inner conduit is regulated when said at least one second opening is blocked or unblocked by a third valve and said at least one third opening is blocked or unblocked by a fourth valve.

\* \* \* \* \*